(12) United States Patent
Sordelli et al.

(10) Patent No.: US 12,043,096 B2
(45) Date of Patent: *Jul. 23, 2024

(54) MULTI-AXIS HINGE FOR A STYLIZED VEHICLE DOOR

(71) Applicant: Karma Automotive LLC, Irvine, CA (US)

(72) Inventors: Jorge Sordelli, Irvine, CA (US); Herbert Ruisinger, Laguna Niguel, CA (US); Jacques Flynn, Long Beach, CA (US); Andre Franco Luis, Orange, CA (US); Andreas Thurner, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,022

(22) Filed: Apr. 24, 2023

(65) Prior Publication Data

US 2023/0256796 A1      Aug. 17, 2023

Related U.S. Application Data

(63) Continuation of application No. 16/376,991, filed on Apr. 5, 2019, now Pat. No. 11,660,940.

(51) Int. Cl.
*B60J 5/00* (2006.01)
*B60J 5/04* (2006.01)
*E05D 3/10* (2006.01)
*E05D 7/00* (2006.01)

(52) U.S. Cl.
CPC .............. *B60J 5/0472* (2013.01); *E05D 3/10* (2013.01); *E05D 7/00* (2013.01); *E05Y 2900/531* (2013.01)

(58) Field of Classification Search
CPC . B60J 5/0472; E05D 3/10; E05D 7/00; E05Y 2900/531
See application file for complete search history.

(56) References Cited

U.S. PATENT DOCUMENTS

| | | |
|---|---|---|
| 6,808,223 B1 | 10/2004 | Braum et al. |
| 2005/0166363 A1 | 8/2005 | Hoffman |
| 2007/0245525 A1 | 10/2007 | Hoffman |

(Continued)

FOREIGN PATENT DOCUMENTS

| | | | | |
|---|---|---|---|---|
| CN | 1934329 A | 3/2007 | | |
| CN | 107901738 A | * 4/2018 | ............. | B60J 5/047 |

(Continued)

OTHER PUBLICATIONS

Translation of FR2945240 (Year: 2010).*

(Continued)

*Primary Examiner* — Daniel J Troy
*Assistant Examiner* — Daniel Alvarez
(74) *Attorney, Agent, or Firm* — Honigman LLP; Grant Griffith; Thomas Appledorn

(57) ABSTRACT

A multi-axis hinge mechanism for a vehicle door. The multi-axis hinge mechanism moves the vehicle door laterally and vertically by means of multiple axial rotations. An actuator pivots the door hinges attaching the door to the vehicle to move the door away from the vehicle while a set of gears translates the motion of the actuator into a vertical rotation of the door.

20 Claims, 12 Drawing Sheets

(56) References Cited

U.S. PATENT DOCUMENTS

2008/0083090 A1    4/2008   Hoffman
2018/0291658 A1   10/2018   Trentin et al.
2019/0218838 A1    7/2019   Von Koenigsegg

FOREIGN PATENT DOCUMENTS

| CN | 107901738 A | | 4/2018 | |
|---|---|---|---|---|
| CN | 109084003 A | | 12/2018 | |
| FR | 2945240 A1 | * | 11/2010 | ............... B60J 1/14 |
| FR | 2945240 A1 | | 11/2010 | |
| WO | 2015068178 A1 | | 4/2015 | |

OTHER PUBLICATIONS

Translation of CN107901738 (Year: 2018).*
China National Intellectual Property Administration, Office Action for Application No. 202080037281.1 dated Nov. 30, 2022 (and English translation).
German Patent Office, Office Action for Application No. 112020001764.8 dated Nov. 28, 2022.
United States Patent and Trademark Office, Office Action for U.S. Appl. No. 16/376,991 dated Dec. 9, 2021.
United States Patent and Trademark Office, Final Office Action for U.S. Appl. No. 16/376,991 dated Mar. 23, 2022.
United States Patent and Trademark Office, Office Action for U.S. Appl. No. 16/376,991 dated Jul. 28, 2022.
International Search Report and Written Opinion dated Jul. 17, 2020 issued in related International PCT Application No. PCT/US2020/026749; filed Apr. 3, 2020.

* cited by examiner

MULTI-AXIS HINGE FOR A STYLIZED VEHICLE DOOR

CROSS REFERENCE TO PRIOR APPLICATIONS

This U.S. patent application is a continuation of, and claims priority under 35 U. S. C. § 120 from, U.S. patent application Ser. No. 16/376,991, filed on Apr. 5, 2019. The disclosure of this prior application is considered part of the disclosure of this application and is hereby incorporated by reference in its entirety.

TECHNICAL FIELD

The present disclosure relates to a multi-axis hinge mechanism for a vehicle door, and in particular a multi-axis hinge mechanism for a wide profile vehicle door with a non-standard cut line.

BACKGROUND

Vehicles that operate in public environments or that require a specific aerodynamic profile almost always include vehicle doors so that the vehicle may allow occupants to enter and exit the vehicle while keeping the occupants safe during transit or streamlining the vehicle for minimum air resistance. Such vehicle doors are typically mounted on a basic hinge that connects and pivots the door on a forward or backward end of the door. This method of assembly is serviceable and economical, but it presents several design restrictions. Any vehicle door attached to such a hinge must be no longer than a certain length, otherwise the vehicle door is likely to collide with other nearby vehicles or objects when opening. Such vehicle doors also typically require a specific cut line design to accommodate the hinge mechanism and its function. This restricts the options available to create aesthetically pleasing cut lines for vehicle doors.

It is desirable to find a hinge mechanism that reduces the chance of impacting a nearby object when opening the attached vehicle door and that allows for the design of a wide variety of vehicle door shapes.

SUMMARY

Disclosed herein is a multi-axis hinge mechanism for connecting a vehicle door to a vehicle frame. In one embodiment, the multi-axis hinge mechanism comprises a first arm pivotally connected to the vehicle frame at a first end of the first arm, a second arm pivotally connected to the vehicle frame at a first end of the second arm, a gearbox pivotally connected, by a first gearbox post, to a second end of the first arm and pivotally connected, by a gearbox pivot joint, to a second end of the second arm, a vehicle door including a second gearbox rod, and an engaged pair of gears including a first gear and a second gear configured to control the pivoting motion of the vehicle door relative to the first arm about a second axis parallel to the second gearbox rod.

In another disclosed embodiment, the first gearbox post is not parallel to the second gearbox rod.

In another disclosed embodiment, the first gear and the second gear are bevel gears. In another disclosed embodiment, the first gear is fixedly mounted to the second end of the first arm, and wherein the is concentric with the first gearbox post. In another disclosed embodiment, the second gear is fixedly mounted to both the vehicle door and the second gearbox rod, and wherein the second gear is concentric with the second gearbox rod.

In another disclosed embodiment, the multi-axis hinge mechanism further comprises an actuator configured to push the first arm and generate, by the second arm, a first pivoting motion about the first gearbox post. In another disclosed embodiment, the pair of gears translates the first pivoting motion into a second pivoting motion of the door about a second axis parallel to the second gearbox rod.

Other aspects, features, and techniques will be apparent to one skilled in the relevant art in view of the following detailed description of the embodiments.

DESCRIPTION OF DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

One aspect of the disclosure is directed to a multi-axis hinge mechanism for a vehicle door, and in particular a multi-axis hinge mechanism for a wide profile vehicle door with a non-standard cut line.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative devices described herein may be combined in a single device, but the application is not limited to the specific exemplary combinations of multi-axis hinge for a vehicle door that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

Figure 1:
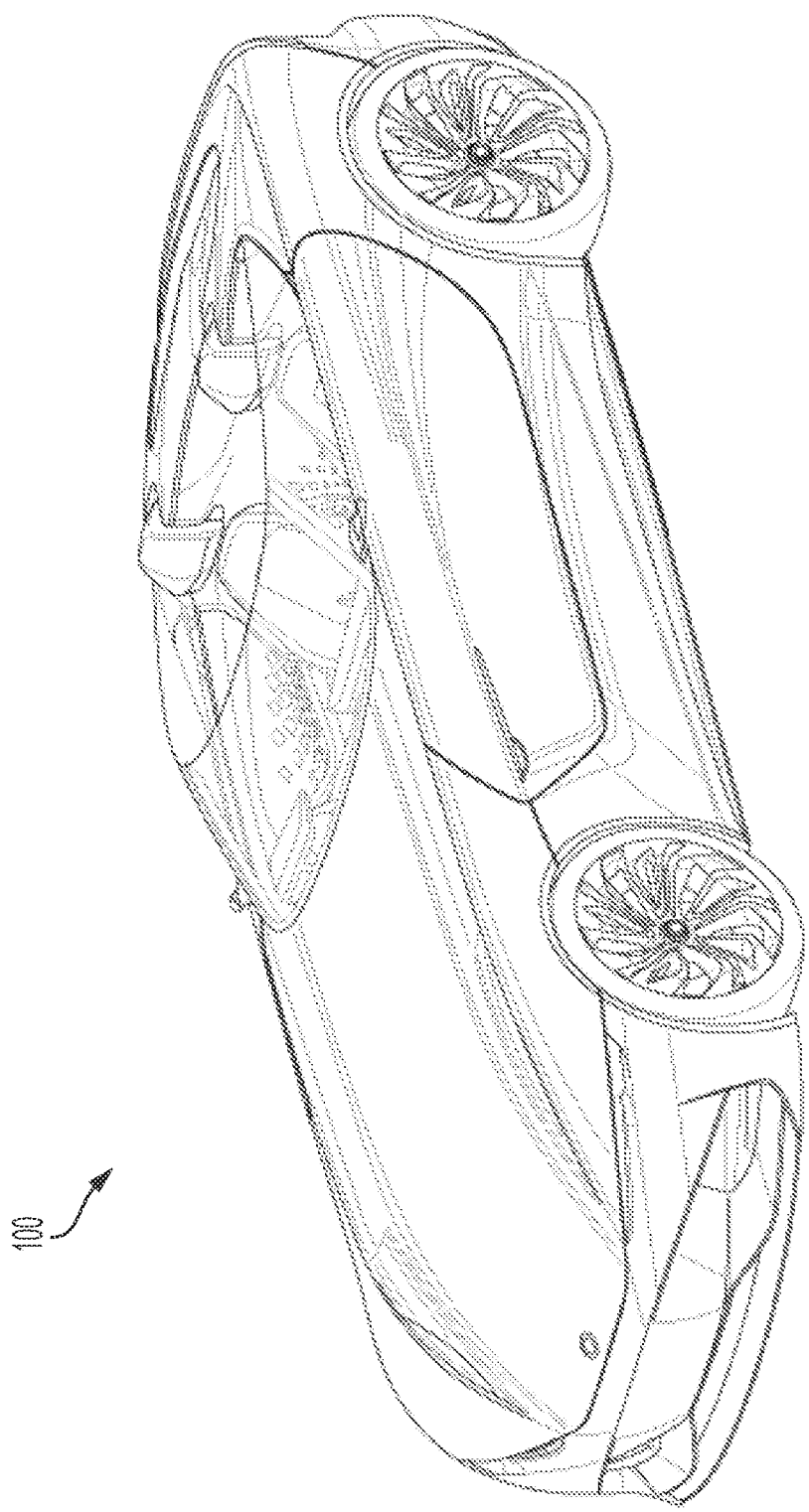
FIG. 1 is a perspective view of an exemplary embodiment of a vehicle including a multi-axis hinge mechanism for a stylized vehicle door.

FIG. 1 is a perspective view of an exemplary embodiment of a vehicle 100 including a multi-axis hinge mechanism 200 for a vehicle door 300. In the depicted embodiment, the multi-axis hinge mechanism 200 and the vehicle door 300 are in a first closed position such that the vehicle cabin is enclosed and the vehicle 100 can travel safely. The vehicle 100 is depicted as a sports vehicle, but the multi-axis hinge mechanism 200 described may be used with any passenger vehicle or other vehicle that requires a vehicle door.

Figure 2:
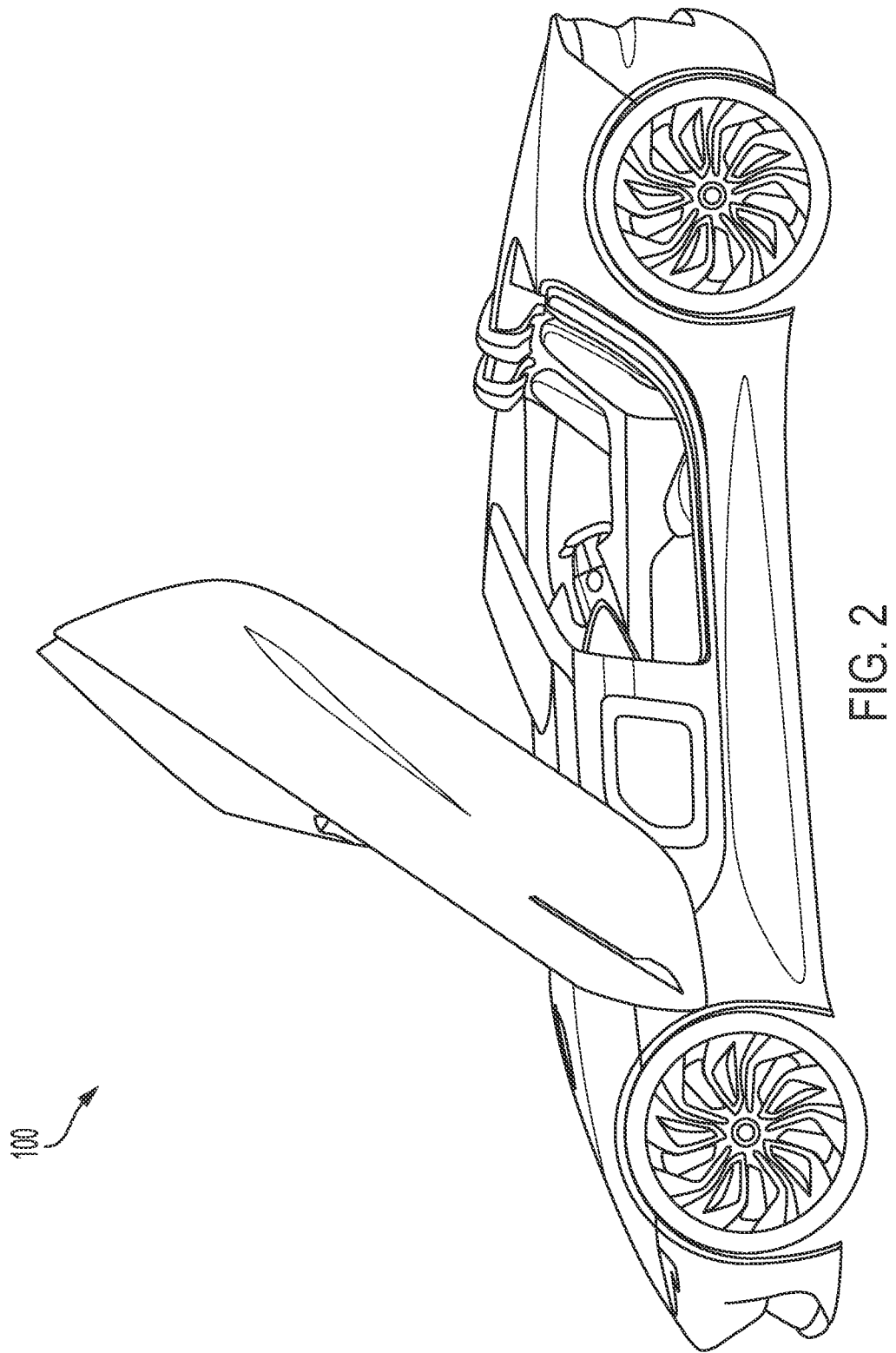
FIG. 2 is a side view of an exemplary embodiment of a multi-axis hinge mechanism and an attached vehicle door.

FIG. 2 is a perspective view of an exemplary embodiment of a multi-axis hinge mechanism 200 and an attached vehicle door 300. In the depicted embodiment, the multi-axis hinge mechanism 200 and the vehicle door 300 are in a second open position such that the vehicle cabin is accessible and vehicle occupants may safely enter and exit the vehicle 100 or access the forward luggage compartment 110.

Figure 3A:
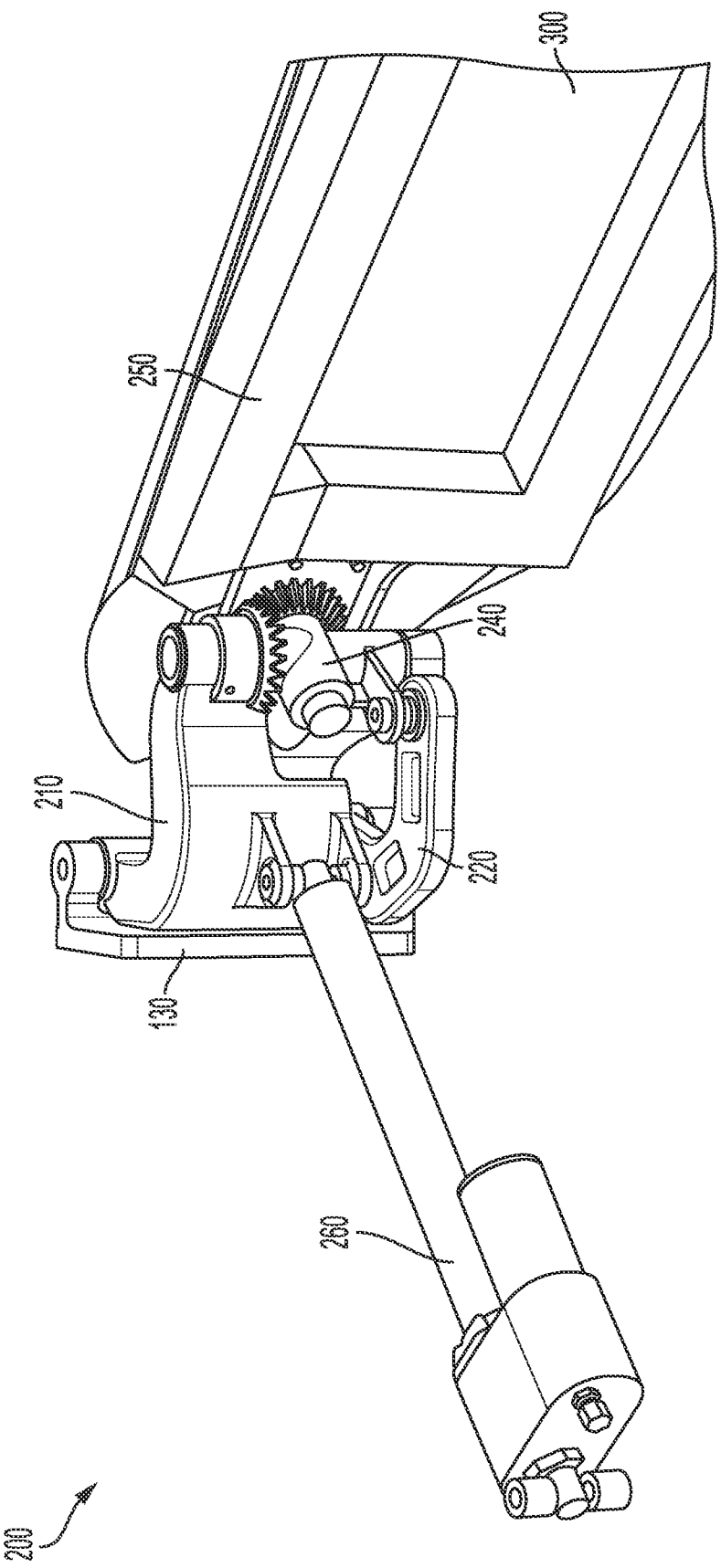
FIG. 3A is a perspective view of an exemplary embodiment of a multi-axis hinge mechanism and an attached vehicle door.
Figure 3B:
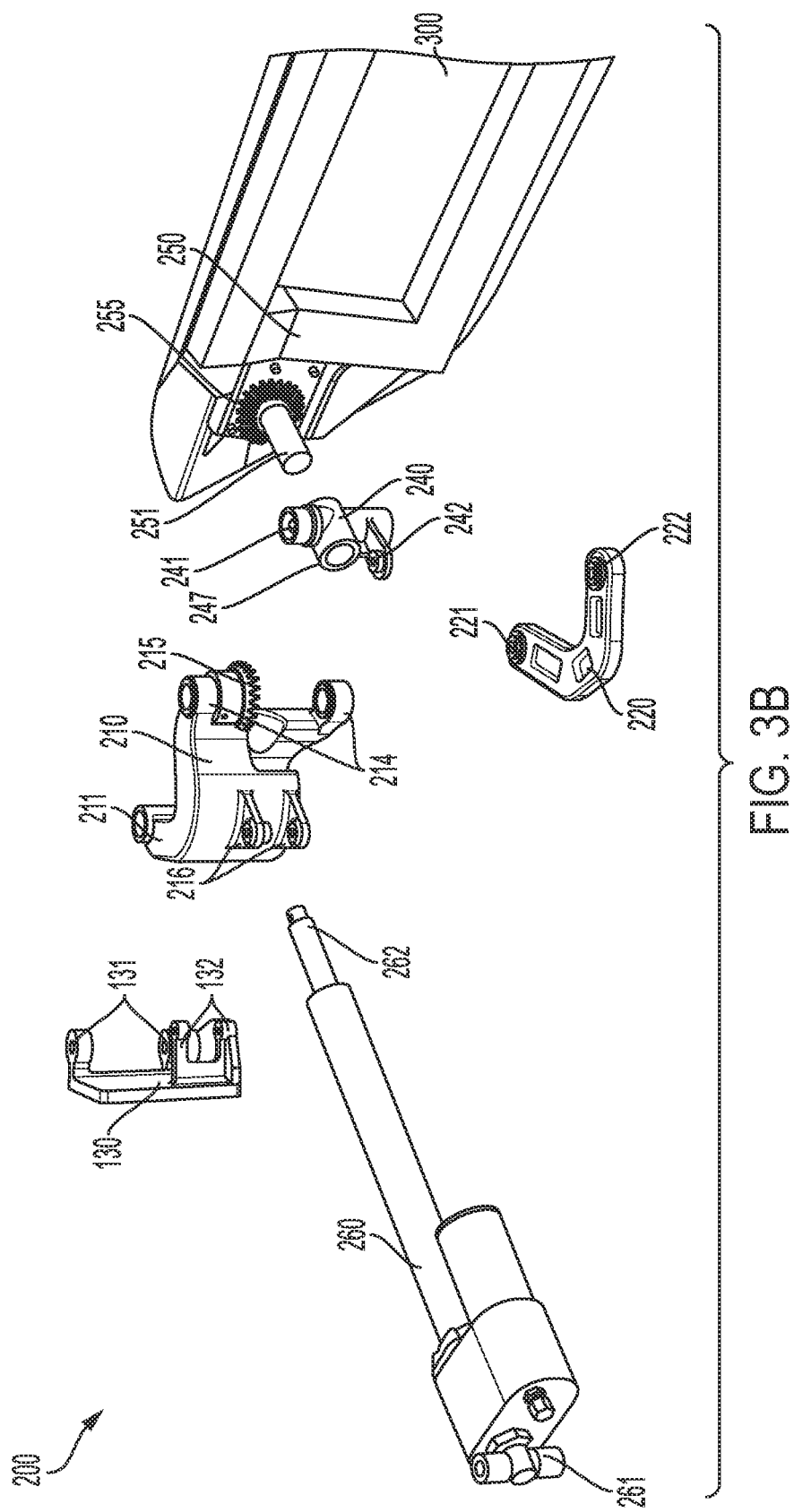
FIG. 3B is an exploded perspective view of an exemplary embodiment of a multi-axis hinge mechanism and an attached vehicle door.

FIG. 3A is a perspective view of an exemplary embodiment of a multi-axis hinge mechanism 200 and an attached vehicle door 300. FIG. 3B is an exploded perspective view of an exemplary embodiment of a multi-axis hinge mechanism 200 and an attached vehicle door 300. According to one embodiment, the multi-axis hinge mechanism 200 includes a first arm 210, a second arm 220, a gearbox hub 240, a door frame 250, and an actuator 260.

According to one embodiment, the first end of the first arm 211 may be pivotally attached to a vehicle bracket 130 by a first pivot joint 131 and the second end of the first arm 214 may be pivotally connected to the first gearbox post 241. According to one embodiment, the second end of the first arm 214 includes a first gear 215 that is fixedly attached to the second end of the first arm 214. The first end of the second arm 221 may be pivotally attached to the vehicle bracket 130 by a second pivot joint 132 and the second end of the second arm 222 may be pivotally connected to the gearbox hub 240 by a gearbox pivot arm extension 242.

According to one embodiment, the door frame 250 is connected to the multi-axis hinge mechanism 200 by a second gearbox rod 251 that rotates about a second axis, wherein the second gearbox rod 251 is held perpendicularly by a gearbox hub bearing 247. The second gearbox rod 251 may rotate within the gearbox hub bearing 247. In one embodiment, the door frame 250 includes a second gear 255 that is fixedly attached to both the vehicle door 300 and the second gearbox rod 251. In one embodiment, the second gear 255 is concentric with the second gearbox rod 251. In one embodiment, a vehicle door 300 may be mounted to the door frame 250.

According to one embodiment, the multi-axis hinge mechanism 200 may include an actuator 260 that is attached to the vehicle 100 by a third pivot pin or rod 261 and pivotally attached to an actuator socket of the first arm 216 by an actuator pivot joint 262.

According to one embodiment, the first pivot joint 211, the second pivot joint 221, the gearbox pivot extension arm 242, the third pivot pin 261, and the actuator pivot joint 262 may protrude at a distance from their respective attach points to the vehicle frame 130, the first arm 210, or the gearbox hub 240. This may be especially significant for the gearbox pivot extension arm 242, as protruding the gearbox pivot extension arm 242 may allow the motion of the second arm 220 to apply leverage to the gearbox hub 240 and cause the first gearbox post 241 to rotate about a first axis.

Figure 4:
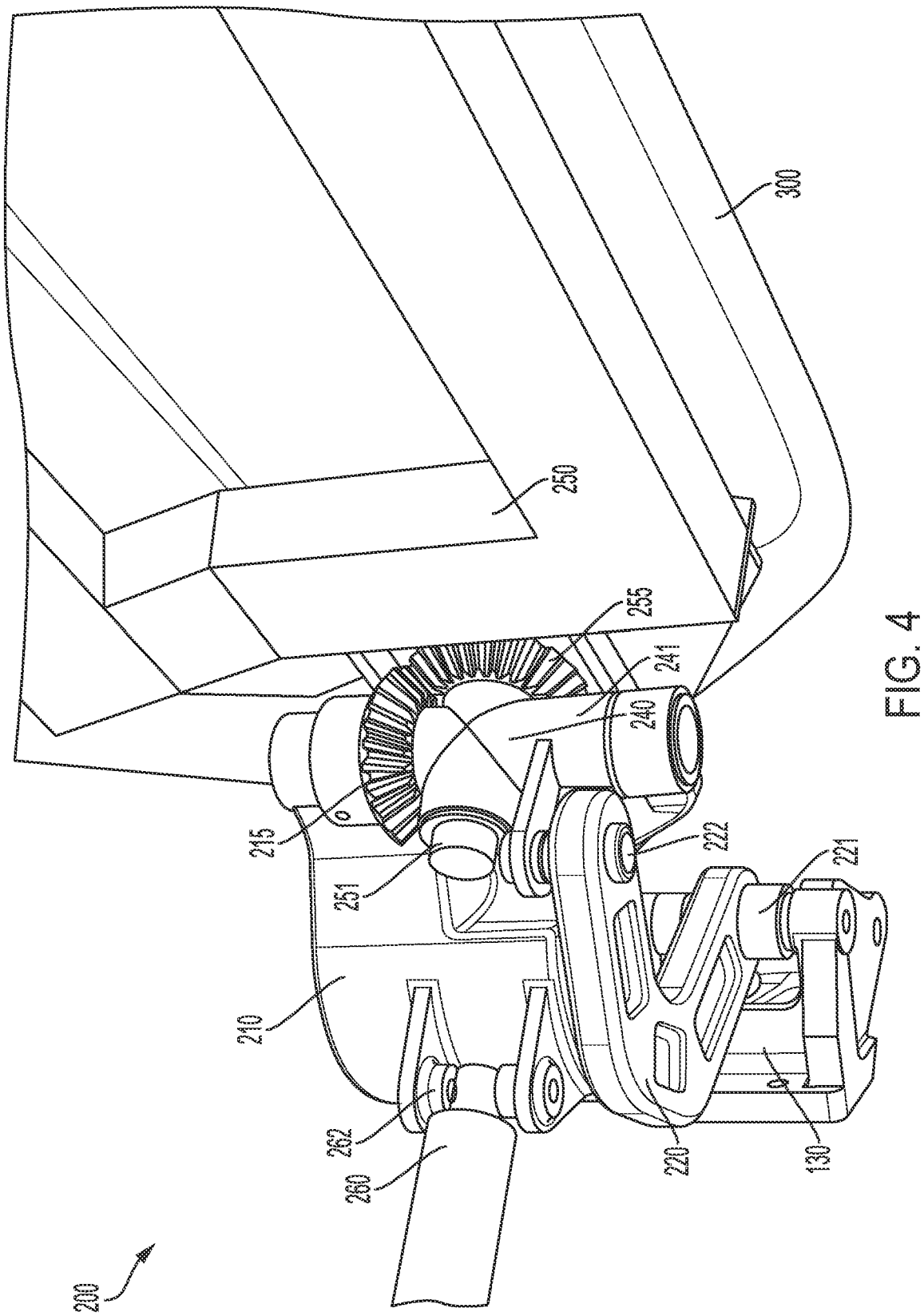
FIG. 4 is a perspective view of an exemplary embodiment of the multi-axis hinge mechanism of FIG. 3A in a first closed position.
Figure 5:
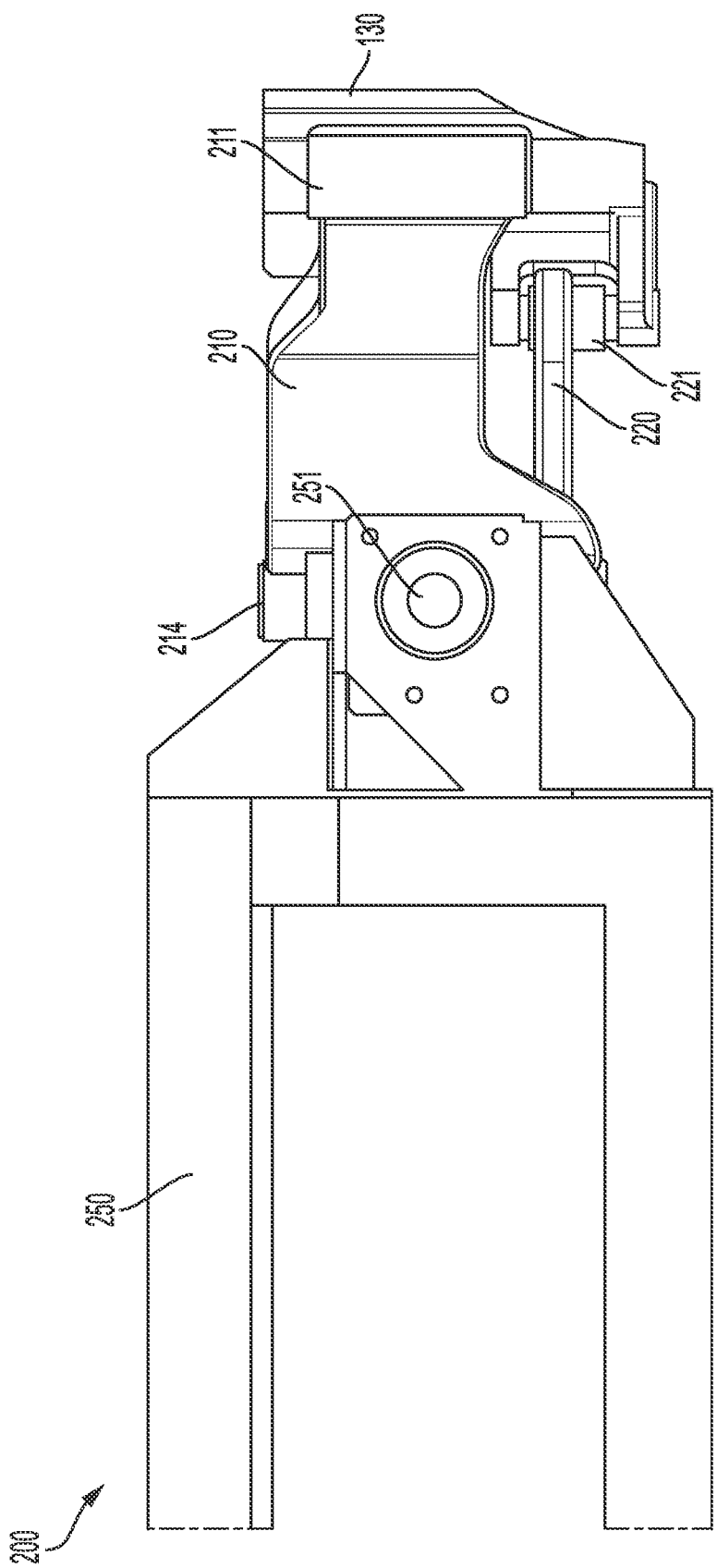
FIG. 5 is a side view of the multi-axis hinge mechanism of FIG. 3A in a first closed position.
Figure 6:
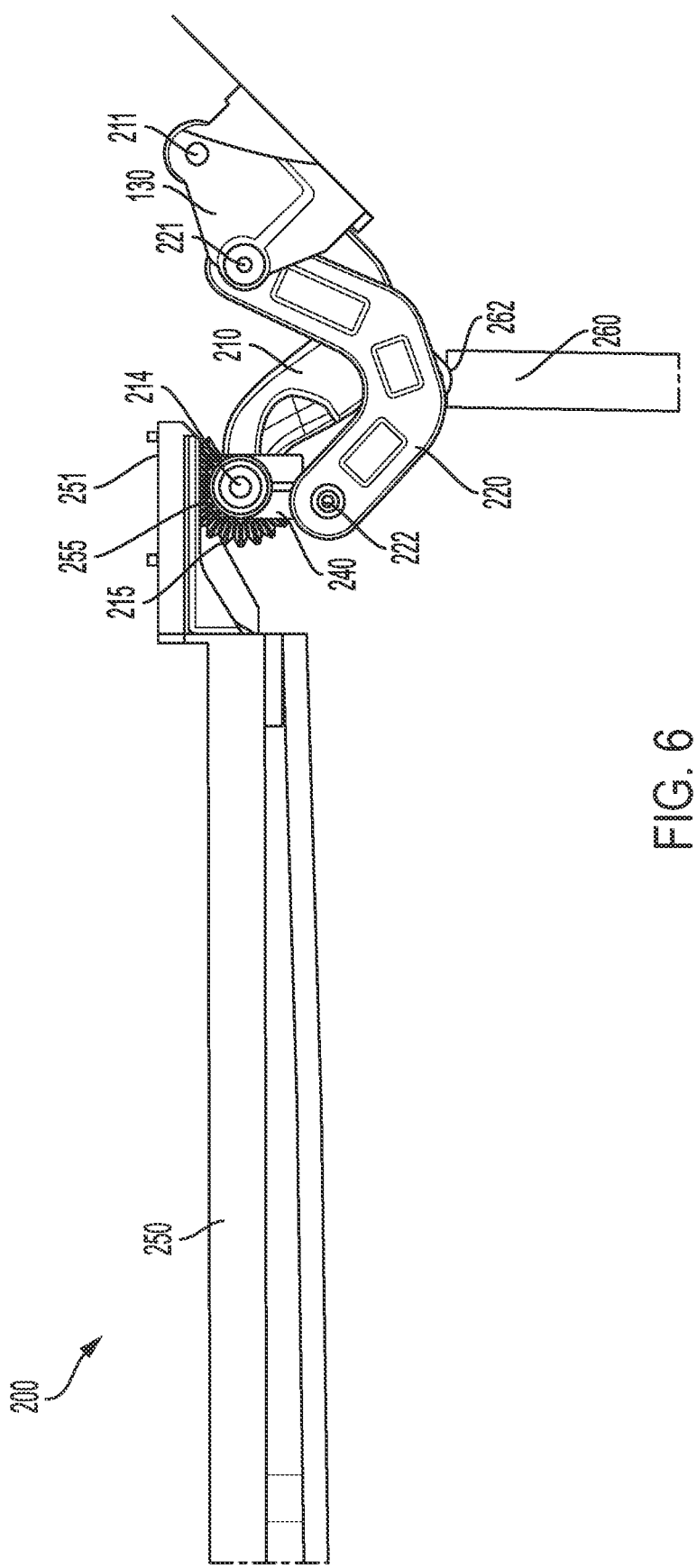
FIG. 6 is a bottom view of the multi-axis hinge mechanism of FIG. 3A in a first closed position.

FIG. 4 is a perspective view of an exemplary embodiment of the multi-axis hinge mechanism 200 of FIG. 3A in a first closed position. FIG. 5 is a side view of the multi-axis hinge mechanism 200 of FIG. 3A in a first closed position. FIG. 6 is a bottom view of the multi-axis hinge mechanism 200 of FIG. 3A in a first closed position.

The actuator 260 may translate lateral motion into rotational motion of the first arm 210 and the second arm 220, wherein the pivoting motion of each arm is performed about the first pivot joint 211 and the second pivot joint 221, respectively. This combined pivoting motion of the first arm 210 and the second arm 220 may translate into a pair of motions of the gearbox hub 240: the motion of the first arm 210 may translate into a lateral motion of the gearbox hub 240, while the motion of the second arm 220 may translate through the gearbox pivot joint 222 into a pivoting motion (hereinafter, the first pivoting motion) of the first gearbox post 241 about a first axis.

According to one embodiment, the first pivoting motion of the first gearbox post 241 may translate into a pivoting or rotating motion (hereinafter, the second pivoting motion) of the second gearbox rod 251. This translation of pivoting motions may be conducted via the first gear 215 and the second gear 255, which may be configured as bevel gears that translate pivoting or rotational motion from rotation about one axis to rotation about a second, non-parallel axis. In order to facilitate this translation of pivoting motions, the first gear 215 and the second gear 255 may be meshed with one another such that their gear teeth are interlocked. In one embodiment, the door frame 250 may pivot in a manner corresponding with the second pivoting motion as a result of being fixed to both the second gearbox rod 251 and the second gear 255.

Figure 7:
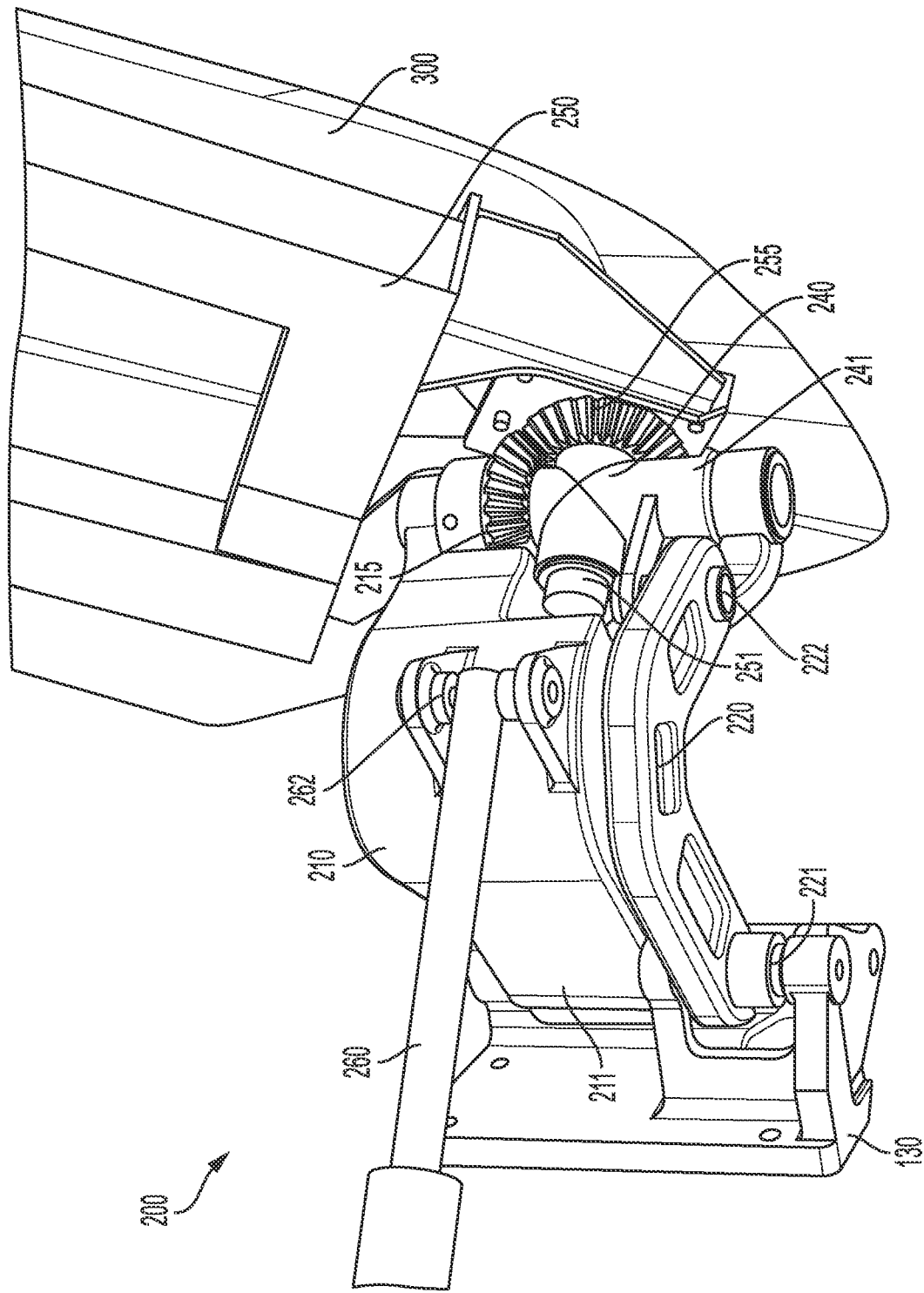
FIG. 7 is a perspective view of the multi-axis hinge mechanism of FIG. 3A in a second open position.
Figure 8:
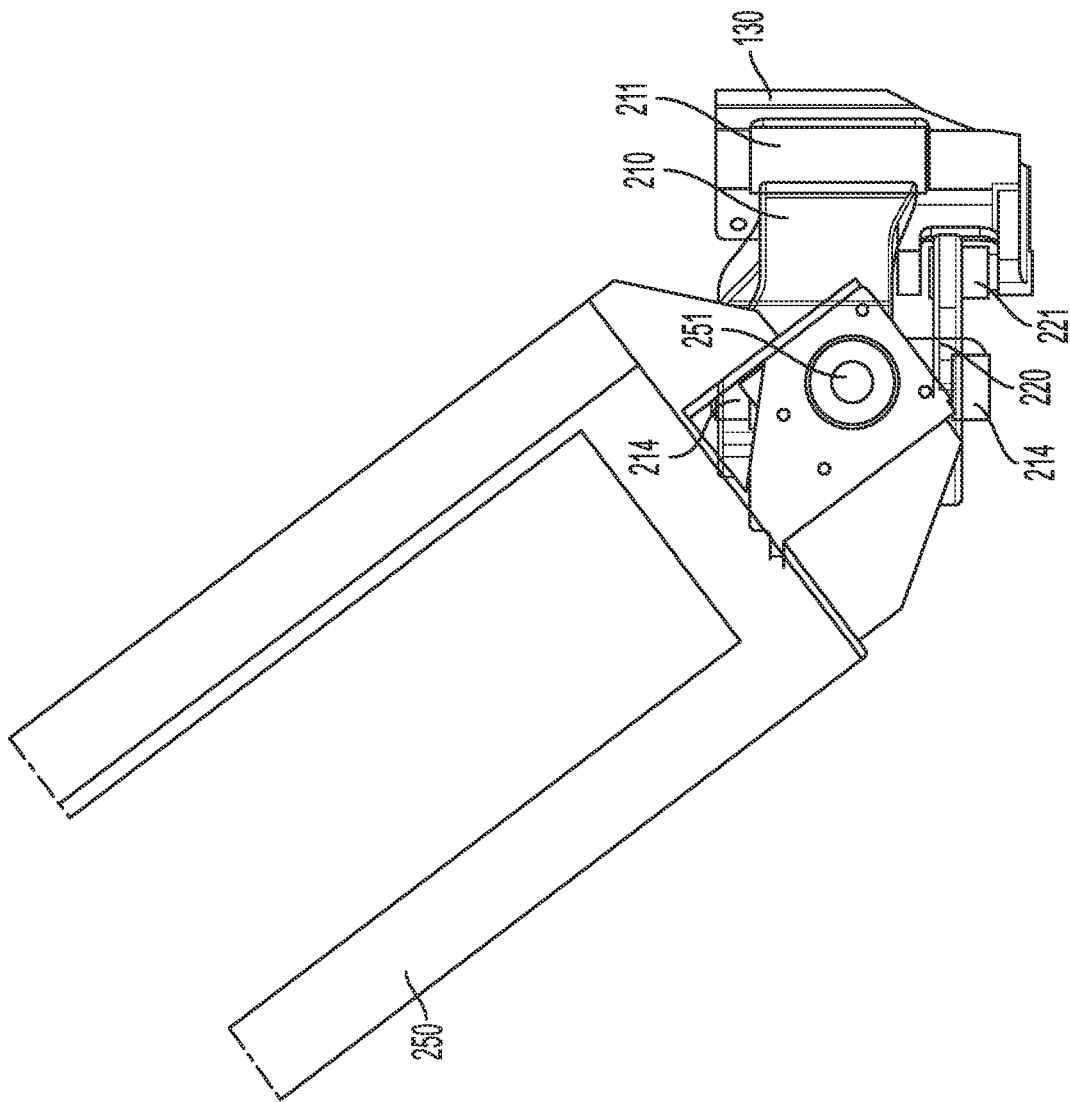
FIG. 8 is a side view of the multi-axis hinge mechanism of FIG. 3A in a second open position.
Figure 9:
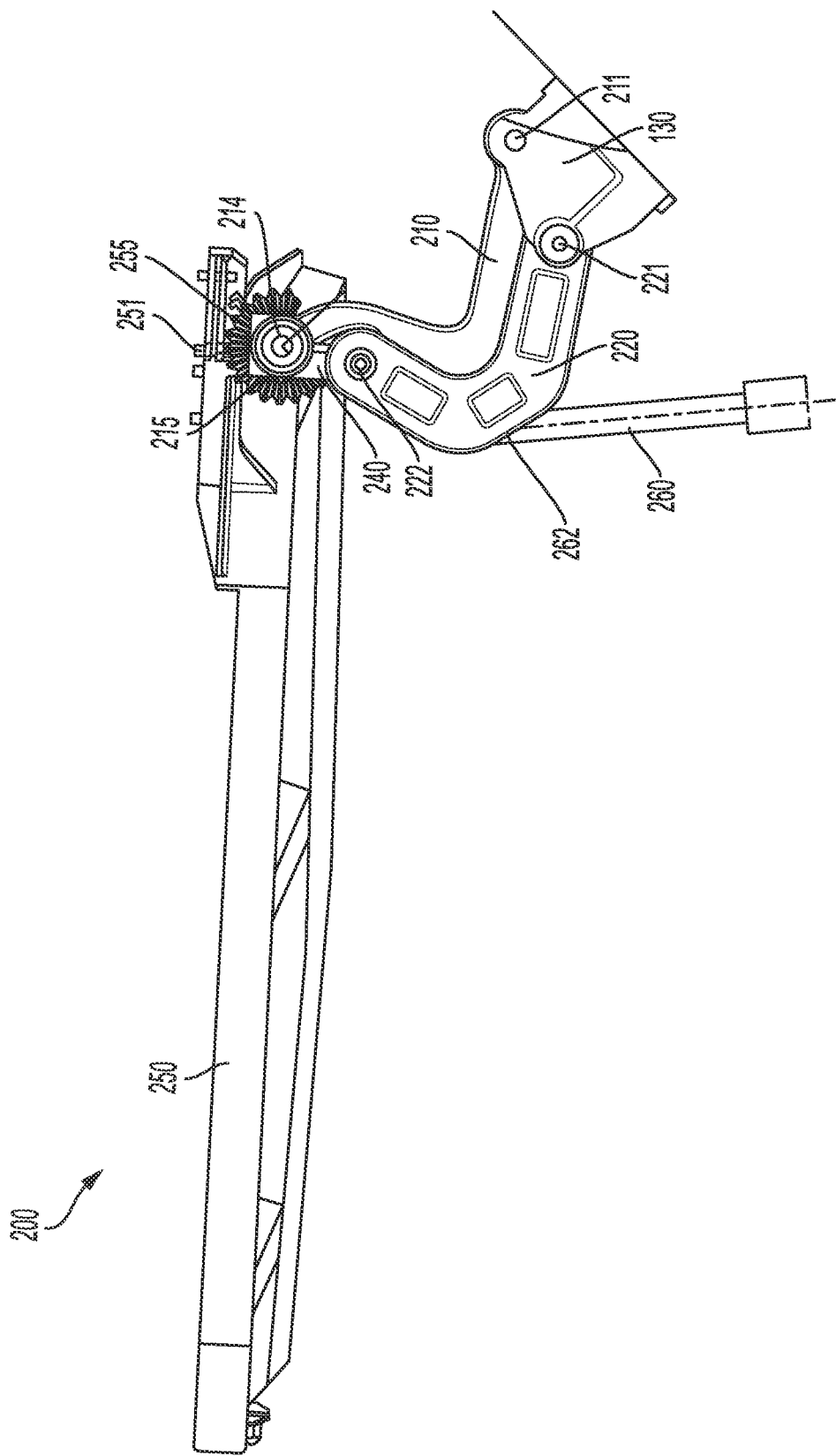
FIG. 9 is a bottom view of the multi-axis hinge mechanism of FIG. 3A in a second open position.

FIG. 7 is a perspective view of an exemplary embodiment of the multi-axis hinge mechanism 200 of FIG. 3A in a second open position. FIG. 8 is a side view of the multi-axis hinge mechanism 200 of FIG. 3A in a second open position. FIG. 9 is a bottom view of the multi-axis hinge mechanism 200 of FIG. 3A in a second open position.

The pivoting motions of the first arm 210 and the second arm 220 that bring the multi-axis hinge mechanism 200 to the second open position may combine in such a way as to resemble an outward lateral motion for the vehicle door 300, such that the vehicle door 300 "pops out" horizontally with respect to the vehicle 100 when moving from the first closed position to the second open position. The pivoting motions of the first arm 210 and the second arm 220 may also produce a first pivoting motion about the first gearbox post 241.

In one embodiment, the first gear 215 and the second gear 255 translate the first pivoting motion into a second pivoting motion of the second gearbox rod 251. The second pivoting motion of the second gearbox rod 251 may in turn create a vertical pivoting motion of the door frame 250 and the vehicle door 300, such that the vehicle door 300 pivots vertically with respect to the vehicle 100 when moving from the first closed position to the second open position.

In one embodiment, the pivoting motions of the first arm 210 and the second arm 220 may give the vehicle door 300 enough clearance from the vehicle 100 to complete the vertical pivoting motion without colliding into the vehicle 100 while avoiding collision with any nearby objects.

According to one embodiment, the net effect of the above described outward lateral motion and vertical pivoting motion is to open the vehicle door 300 while keeping the top-down profile of the vehicle 100 as narrow as possible, thereby minimizing the chance of the vehicle door 300 colliding with a nearby object, and further allowing for the vehicle door 300 to be designed with a longer silhouette than is industry standard. According to one embodiment, the multi-axis hinge mechanism 200 may also allow for the vehicle door 300 to be designed with a non-standard silhouette shape, including but not limited to an oval.

Figure 10:
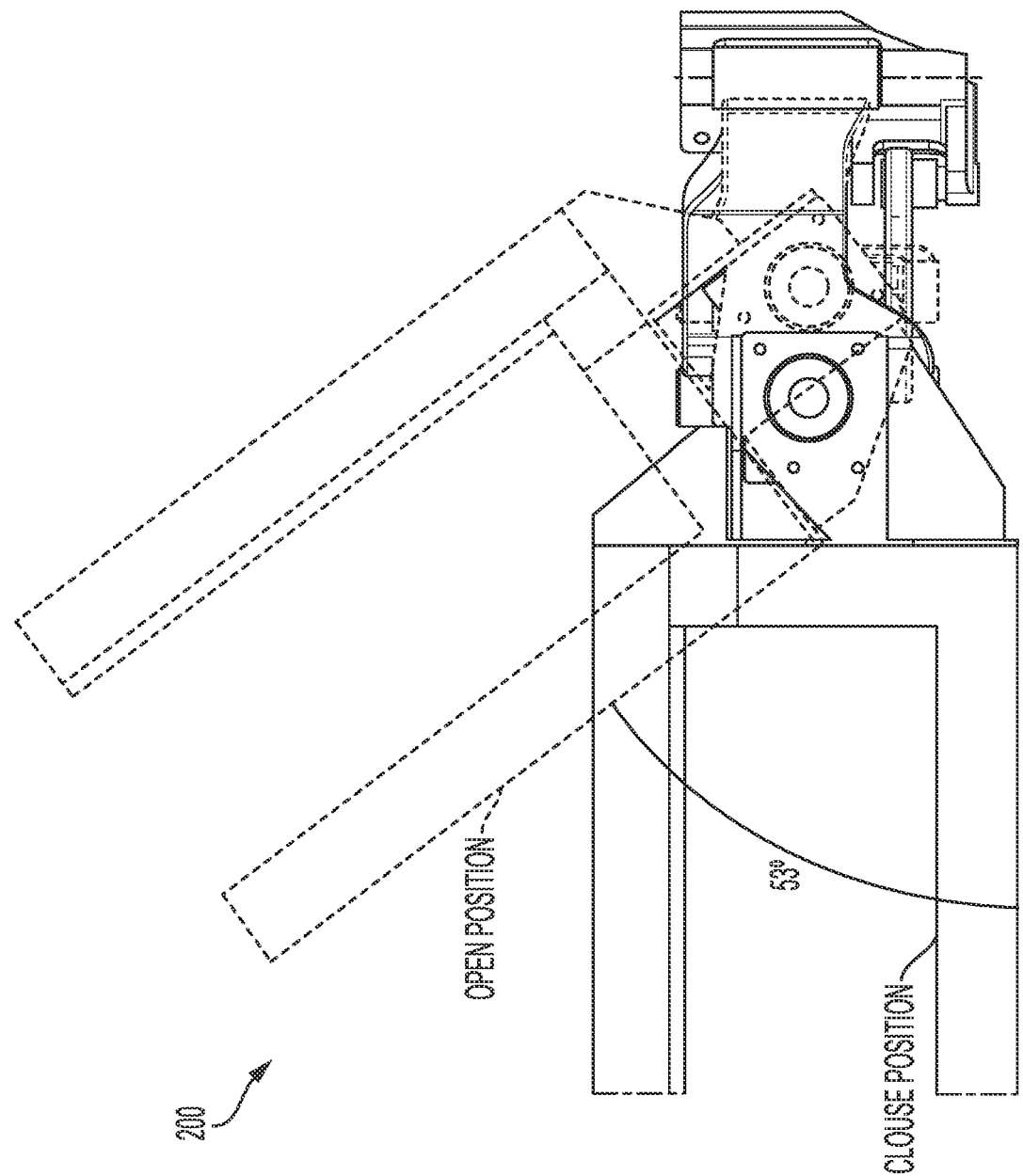
FIG. 10 is a side view of the multi-axis hinge mechanism of FIG. 3A comparing the first closed position to the second open position.
Figure 11:
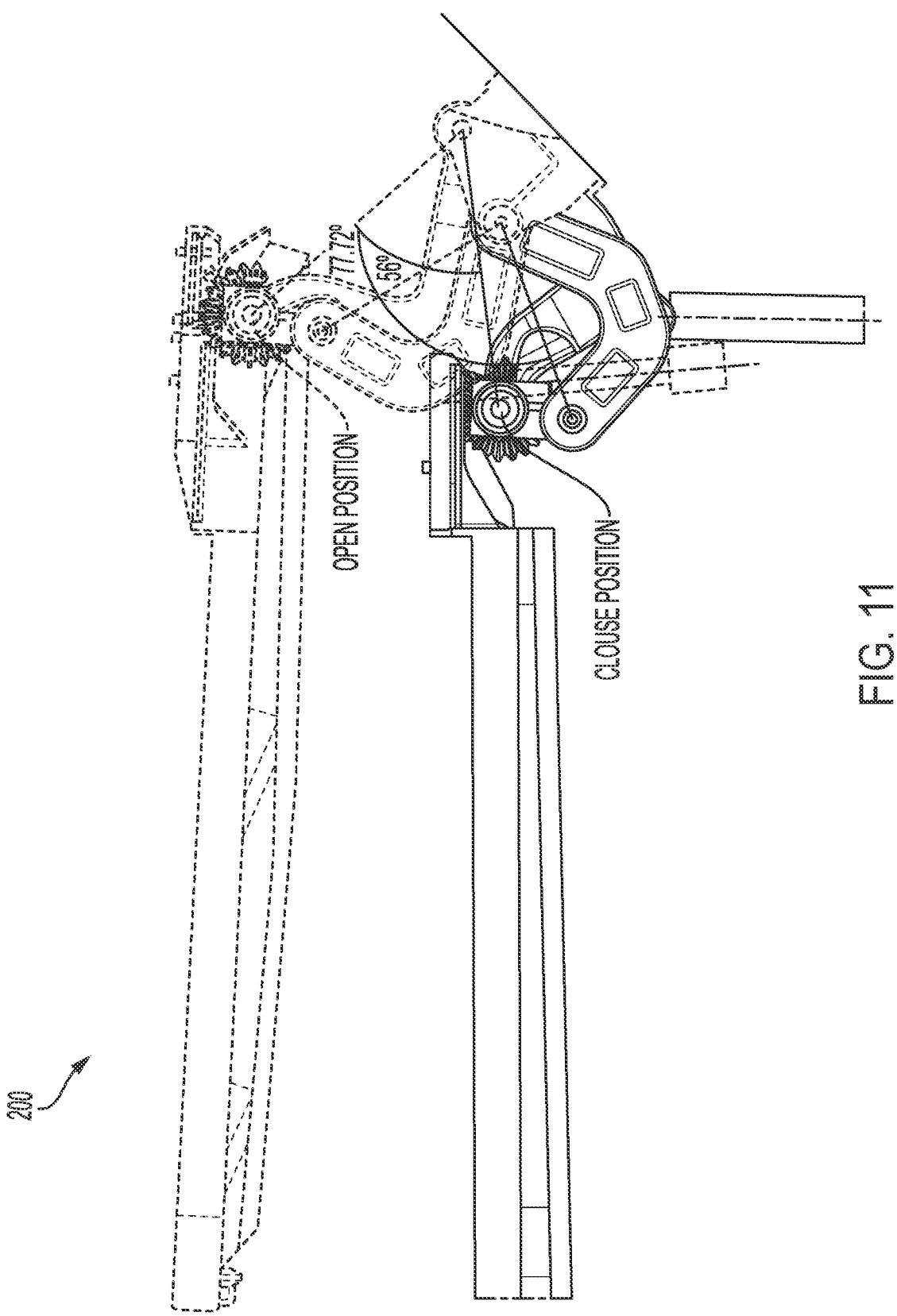
FIG. 11 is a bottom view of the multi-axis hinge mechanism of FIG. 3A comparing the first closed position to the second open position.

FIG. 10 is a side view of the multi-axis hinge mechanism 200 of FIG. 3A comparing the first closed position to the second open position. FIG. 11 is a bottom view of the multi-axis hinge mechanism 200 of FIG. 3A comparing the first closed position to the second open position.

According to one embodiment, the first arm 210 pivots at the first pivot joint 211 in a 56-degree arc between the first closed position and the second open position. According to one embodiment, the second arm 220 pivots at the second pivot joint 221 in a 77.72-degree arc between the first closed position and the second open position while producing the first pivoting motion about the first gearbox post 241. According to one embodiment, the second gearbox rod 251 may pivot in a 53-degree arc between the first closed position and the second open position while completing the second pivoting motion.

While this disclosure makes reference to exemplary embodiments, it will be understood by those skilled in the art that various changes in form and details may be made therein without departing from the scope of the claimed embodiments.

What is claimed is:

1. A multi-axis hinge mechanism for connecting a vehicle door to a vehicle frame, the multi-axis hinge mechanism comprising:
   a first arm having a first end and a second end, the first end of the first arm pivotally connected to the vehicle frame;
   a gearbox hub pivotally connected, by a gearbox post having a first axis, to the second end of the first arm, the gearbox hub comprising a through-hole extending through the gearbox hub along a second axis, the second axis perpendicular to the first axis; and
   a gearbox rod extending from the vehicle door, wherein:
      at least a portion of the gearbox rod is disposed within the through-hole of the gearbox hub; and
      rotation by the gearbox rod about the second axis relative to the gearbox hub causes the vehicle door to translate between an open position and a closed position.

2. The multi-axis hinge mechanism of claim 1, further comprising a gearbox hub bearing disposed within the through-hole of the gearbox hub, wherein the gearbox post rotates within the gearbox hub bearing during translation of the vehicle door between the open position and the closed position.

3. The multi-axis hinge mechanism of claim 1, further comprising:
   a first gear disposed on the first arm having teeth positioned coaxially with the gearbox post; and
   a second gear disposed on the vehicle door and has teeth positioned coaxially with the gearbox rod,
   wherein the first gear and the second gear are configured to control a pivoting motion of the vehicle door relative to the first arm about the second axis when the vehicle door translates between the open position and the closed position.

4. The multi-axis hinge mechanism of claim 1, wherein the first gear is fixedly mounted to the second end of the first arm.

5. The multi-axis hinge mechanism of claim 1, further comprising a pivot extension arm extending outwardly away from the gearbox hub from a first end to a second end at a distance, the first end of the pivot extension arm coupled to the gearbox hub.

6. The multi-axis hinge mechanism of claim 5, further comprising a second arm having a first end and a second end, the first end of the second arm pivotally connected to the vehicle frame and the second end of the second arm pivotally coupled to the second end of the pivot extension arm.

7. The multi-axis hinge mechanism of claim 6, further comprising an actuator configured to move between an un-actuated position and an actuated position, wherein movement by the actuator from the un-actuated position to the actuated position pushes the first arm and the distance the pivot extension arm extends from the gearbox hub applies leverage to the gearbox hub to cause the second arm to generate a pivoting motion about the first axis of the gearbox post.

8. The multi-axis hinge mechanism of claim 1, wherein the gearbox post is not parallel to the gearbox rod.

9. A multi-axis hinge mechanism for connecting a vehicle door to a vehicle frame, the multi-axis hinge mechanism comprising:
   a first arm having a first end and a second end, the first end of the first arm pivotally connected to the vehicle frame;
   a gearbox hub pivotally connected, by a gearbox post having a first axis, to the second end of the first arm, the gearbox hub comprising a gearbox hub bearing disposed within a through-hole extending through the gearbox hub along a second axis, wherein the first axis is perpendicular to the second axis; and
   a gearbox rod extending from the vehicle door, wherein:
      at least a portion of the gearbox rod is disposed within the gearbox hub bearing; and
      rotation by the gearbox rod about the second axis relative to the gearbox hub causes the vehicle door to translate between an open position and a closed position.

10. The multi-axis hinge mechanism of claim 9, further comprising:
    a first gear disposed on the first arm having teeth positioned coaxially with the gearbox post; and
    a second gear disposed on the vehicle door and has teeth positioned coaxially with the gearbox rod, wherein the first gear and the second gear are configured to control a pivoting motion of the vehicle door relative to the first arm about the second axis when the vehicle door is translated between the open position and closed position.

11. The multi-axis hinge mechanism of claim 10, wherein the first gear is fixedly mounted to the second end of the first arm.

12. The multi-axis hinge mechanism of claim 9, further comprising a pivot extension arm extending outwardly away from the gearbox hub from a first end to a second end at a distance, the first end of the pivot extension arm coupled to the gearbox hub.

13. The multi-axis hinge mechanism of claim 12, further comprising a second arm having a first end and a second end, the first end of the second arm pivotally connected to the vehicle frame and the second end of the second arm pivotally coupled to the second end of the pivot extension arm.

14. The multi-axis hinge mechanism of claim 9, wherein the gearbox post is not parallel to the gearbox rod.

15. A method of operating a vehicle door between an open position and a closed position, the method comprising:
pivotally connecting, to a vehicle frame, a first end of a first arm of a multi-axis hinge mechanism;
pivotally connecting, by a gearbox post having a first axis, a gearbox hub of the multi-axis hinge mechanism to a second end of the first arm of the multi-axis hinge mechanism, wherein the gearbox hub comprises a through-hole extending through the gearbox hub along a second axis, the second axis perpendicular to the first axis; and rotating a gearbox rod of the multi-axis hinge mechanism about the second axis relative to the gearbox hub to cause the vehicle door to translate between the open position and the closed position, wherein the gearbox rod extends from the vehicle door and at least a portion of the gearbox rod is disposed within the through-hole of the gearbox hub.

16. The method of claim 15, further comprising rotating the gearbox post within a gearbox hub bearing of the multi-axis hinge mechanism when the vehicle door translates between the open position and the closed position.

17. The method of claim 15, further comprising coupling a first end of a pivot extension arm to the gearbox hub, the pivot extension arm extending outwardly away from the gearbox hub from the first end to a second end at a distance.

18. The method of claim 15, further comprising:
pivotally connecting, to the vehicle frame, a first end of a second arm of the multi-axis hinge mechanism; and
pivotally coupling, to the second end of the pivot extension arm, a second end of the second arm of the multi-axis hinge mechanism.

19. The method of claim 18, further comprising moving an actuator between an un-actuated position and an actuated position, wherein movement by the actuator from the un-actuated position to the actuated position pushes the first arm and the distance the pivot extension arm extends from the gearbox hub applies leverage to the gearbox hub to cause the second arm to generate a pivoting motion about the first axis of the gearbox post.

20. The method of claim 15, wherein the gearbox post is not parallel to the gearbox rod.

* * * * *